Oct. 20, 1931.  H. A. HUSTED  1,828,047
STEERING WHEEL
Filed Feb. 7, 1929   2 Sheets-Sheet 1
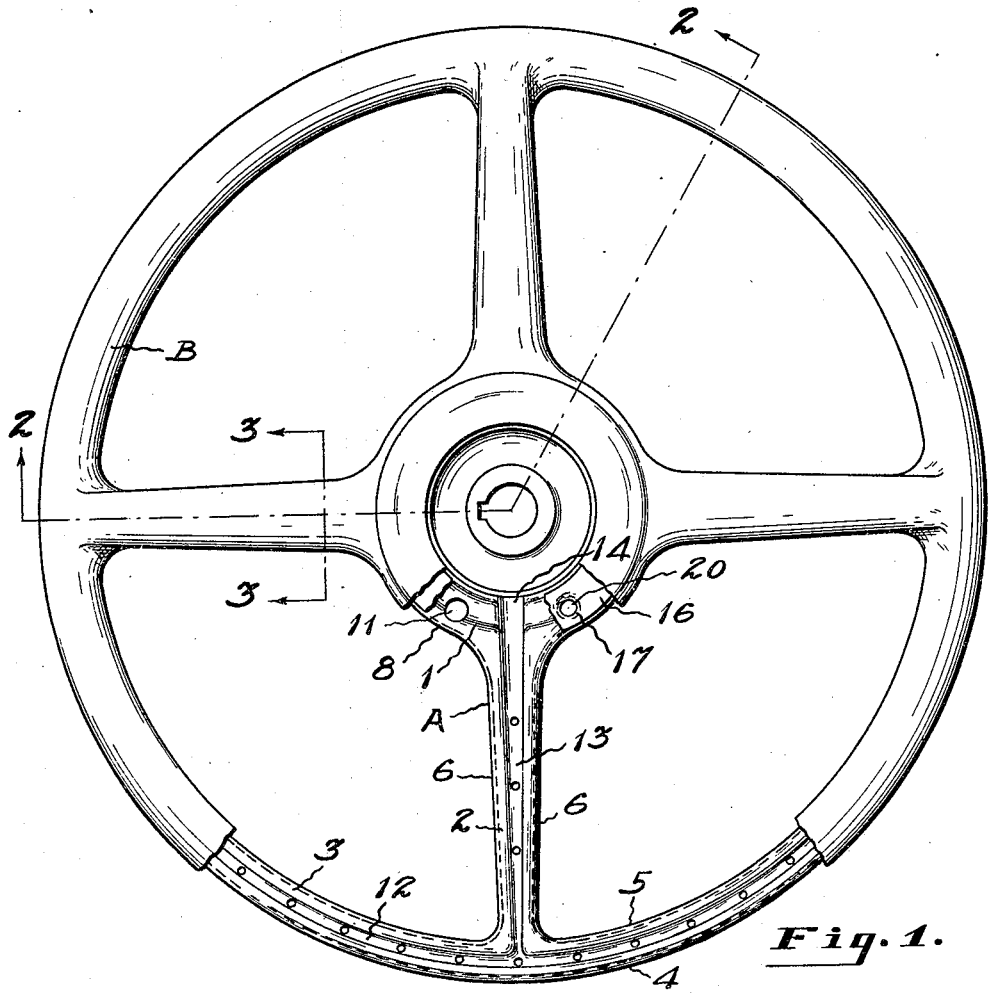
Fig. 1.
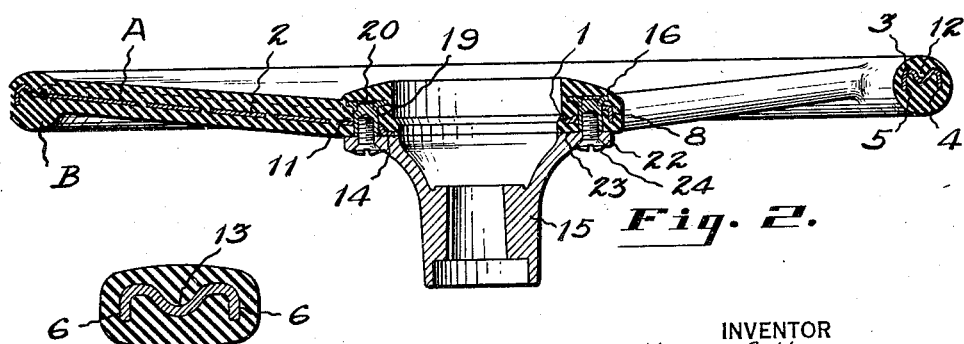
Fig. 2.
Fig. 3.
INVENTOR
HARRY A. HUSTED
BY
Evans & McCoy
ATTORNEYS

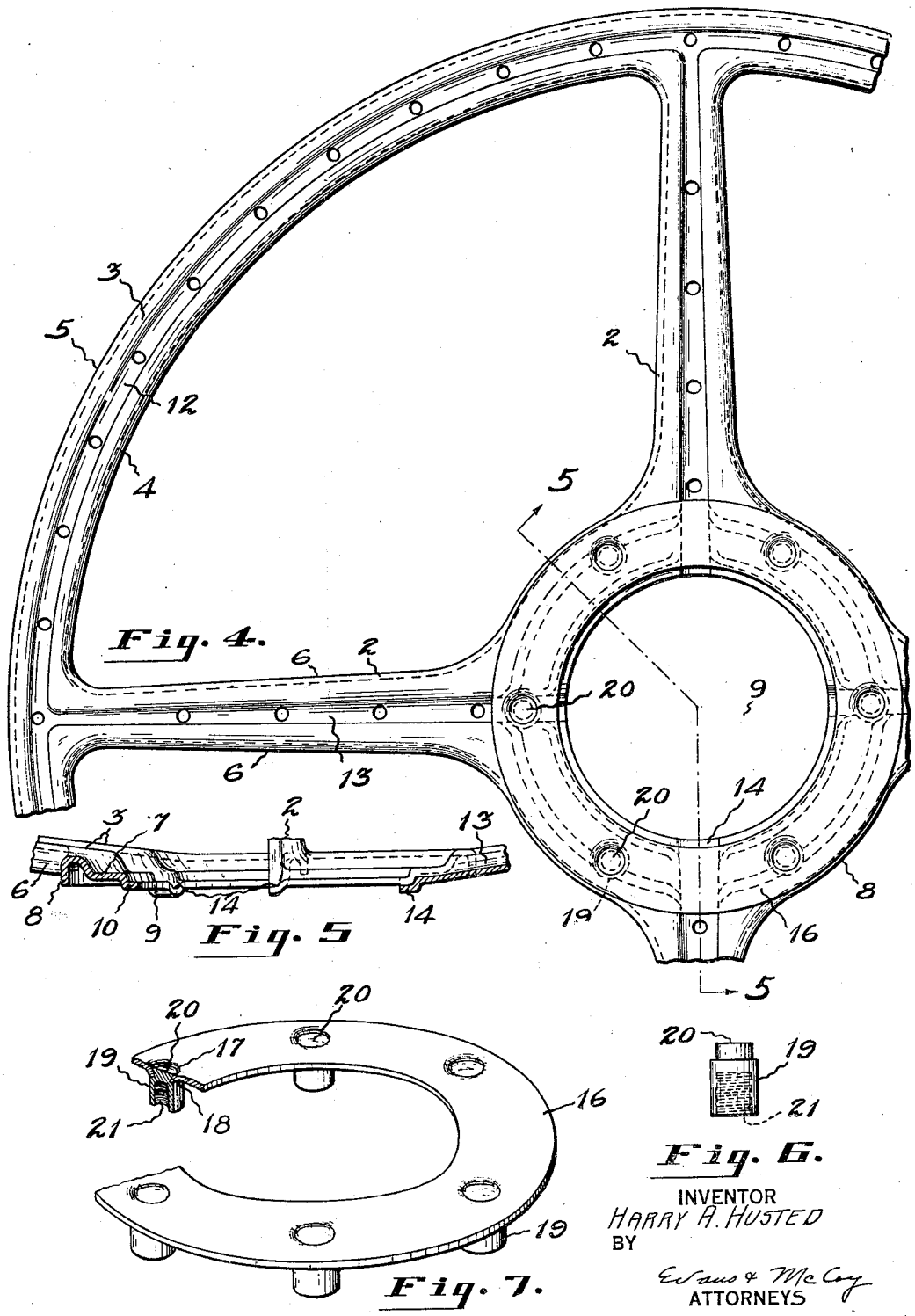

Patented Oct. 20, 1931

1,828,047

UNITED STATES PATENT OFFICE

HARRY A. HUSTED, OF CLEVELAND, OHIO, ASSIGNOR TO THE H. A. HUSTED COMPANY, OF DETROIT, MICHIGAN, A CORPORATION OF MICHIGAN

STEERING WHEEL

Application filed February 7, 1929. Serial No. 338,165.

This invention relates to steering wheels and particularly to the type embodying sheet metal spiders embedded in a composition body.

The principal object of the present invention is to provide a reinforced composition steering wheel with a separately formed hub member which directly engages a reinforcing spider embedded in composition material to provide a rigid structure.

Another object is to provide a steering wheel having a single piece sheet metal reinforcing spider provided with a channeled hub annulus embedded in a composition body.

A further object is to provide a steering wheel having a single piece sheet metal reinforcing spider provided with a channeled hub annulus embedded in a composition body, and a separately formed hub member secured to and having direct engagement with the hub annulus.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a plan view of a steering wheel having portions of the composition material broken away to show the metal reinforcing spider.

Fig. 2 is a transverse section of the steering wheel taken on the line 2—2 of Fig. 1, Fig. 3 is an enlarged transverse section of one of the spokes taken on the line 3—3 of Fig. 1.

Fig. 4 is an enlarged fragmentary plan view of the reinforcing spider showing the hub securing plate positioned thereon.

Fig. 5 is section of the hub annulus of the reinforcing spider taken on the line 5—5 of Fig. 4.

Fig. 6 is an elevation view of one of the hub securing lugs.

Fig. 7 is a perspective view of the plate which carries the hub securing lugs, a portion of which is broken away to show the method of securing a lug thereto.

The present invention is an improvement upon the steering wheel disclosed in copending application of Harry A. Husted Serial No. 167,387 filed January 14, 1927, and proposes a construction wherein the hub portion of the wheel is of greater strength and rigidity. The steering wheel shown in this copending application is composed of a body of initially plastic composition material moulded around a reinforcing spider, which material is continuous throughout the spokes and rim of the wheel, the reinforcing spider being preferably made of sheet metal in a single piece to provide substantially unbreakable connections between the spokes and rim of the wheel.

Referring to the accompanying drawings in which like numerals refer to like parts throughout the several views, the steering wheel shown for illustration comprises a reinforcing spider A completely embodded in a suitable composition body B. The spider A is preferably formed from a single sheet metal blank to provide hub annulus 1, integral spokes 2 radiating therefrom, and a continuous rim 3 integrally united with the spokes 2. The rim 3 is formed with a continuous depending flange 4 at its outer edge and depending inner flanges 5 at its inner edges between the spokes 2, which inner flanges 5 are continuous with longitudinal flanges 6 formed at the sides of the spokes 2. The hub annulus 1 is formed to the shape of a downwardly presenting channel having a stepped web 7 and outer flanges 8 between the spokes 2 that are continuous with the side channels 6 of the spokes. The inner marginal edge of the hub annulus 1 defining the central opening 9 thereof is extended inwardly to form a horizontal flange 10. The hub annulus 1 is also formed with a plurality of spaced openings 11 which are arranged to extend about the center line of the hub annulus as a common axis, the purpose of which will be described later in the specification.

The rim 3 of the reinforcing spider A is further provided with continuous upwardly presenting circumferential depression 12 in the web thereof, which is continuous with longitudinal depressions 13 formed in the web of the spokes 2. These longitudinal spoke depressions 13 extend across the web 7 of the hub annulus to the central opening 9 in such a manner that portions of the metal comprising the inner hub annulus are offset so that the lower faces 14 thereof lie in a plane parallel to and spaced below the plane of the horizontal flange 10 for a purpose to be later described.

It is readily apparent that by forming the depressions in the spokes and rim, and by providing marginal flanges in the manner just described, that a spider structure is formed which is of substantial uniform cross sectional strength throughout, particularly in the zones of connection of the spokes with the rim and hub annulus.

These connections are relatively unbreakable compared to the other portions of the spider so that the spider will not rupture, especially at the points of connection between the rim and spokes. The channeled portions of the spokes give the spokes sufficient longitudinal strength to effectively withstand all stresses that are normally imposed upon the steering wheel. The strength of the spoke is, however, insufficient to cause the spoke to break away from the rim in the event of an accident. If a wheel of this character is subjected to a terrific strain due to a severe accident, the spokes of the wheel will yield before the rim tears away from the spoke elements, thereby enabling the wheel to collapse against the body of the driver because of the distortion of the spokes. The rim being carried by the outer ends of the spokes prevents fatal damage to the driver from the penetration of the spokes which has heretofore so often resulted from accidents involving steering wheels of conventional character.

The spider A as shown in Figs. 2 and 4 is also provided with means for securing the separately formed hub member 15 to the steering wheel. This means comprises an annular plate 16 having a plurality of openings 17 therein, the marginal edges of the openings 17 being flanged inwardly and downwardly as indicated at 18, and a plurality of securing lugs 19, the upper ends 20 of which are reduced in diameter and extend through the openings 17 of the annular ring 16 and are riveted thereto substantially as shown in Fig. 2. The securing lugs 19 are drilled out to provide axial openings 21, which are formed with internal threads.

The spider formed in the manner just described is then supported in a suitable mold cavity, and the annular plate 16 having the lugs 19 secured thereto, is positioned above the hub annulus 1 with the hub securing lugs 19 extending through the openings 11 formed around the web 7 of the hub annulus 1, and with the lower faces of the lugs 19 substantially flush with the lower faces of the offset portions 14 of the inner hub annulus flange 10. Suitable initially plastic composition material is then molded around the spider A and the annular ring 16 to completely embed the same, with the exception of the lower end faces of the hub securing lugs 19 and the lower faces of the offset portions 14 of the hub annulus inner flange 10, substantially as shown in Fig. 2. The composition body B formed by the molding of the composition material is vulcanized or bonded to all parts of the reinforcing spider A and the annular ring 16, to provide a steering wheel structure which is light in weight and very neat in appearance.

The separately formed hub member 15 is provided with a flange 22 having a plurality of openings therein spaced the same as the hub securing lugs 19, and is also provided with a plane upper face 23. The hub 15 is secured to the steering wheel by a plurality of screws 24 which extend through the openings in the flange 22 and are threaded into the axial openings 21 formed in the hub securing lugs 19 to draw the plane surface 23 of the hub member 15 into engagement with the composition body of the steering wheel, and into engagement with the end faces of the securing lugs 19 and the faces of the upset portions 14 formed in the hub annulus inner flange 10.

It is readily apparent from the drawings and foregoing description that a very rigid hub construction is provided principally because of the double channeling of the hub annulus 1 and because of the engagement of the separately formed hub member 15 with the lower faces provided by the offset portions 14 of the inner flange of the hub annulus 1.

It is also apparent that the present invention provides a steering wheel which possesses great strength and by reason of the fact that the rim spokes and hub of the reinforcing spider are integrally connected, the connections between the spokes and the rim are substantially unbreakable so that the rim cannot be broken away from the spokes even when subjected to excessive strains, such as might happen in the case of a wreck.

Furthermore, it is to be understood that the particular sectional shapes of reinforcing spider and the composition body shown and described, and the particular procedure set forth, are presented for purposes of explanation and illustration, and that various modifications may be made without departing from the spirit and substance of the broad invention, the scope of which is commensurate with the appended claims.

What I claim is:

1. A steering wheel comprising a stamped metal spider embodying integral rim, spokes and hub portions of channel shape, downwardly offset portions formed around the inner edge of said hub portion, a composition body molded around and embedding said spider, the lower face of said body being substantially flush with the lower faces of said offset portions, and a sparately formed hub member secured to said wheel in contacting engagement with said lower faces of said offset portions.

2. A steering wheel comprising a one-piece sheet metal spider embodying a circumferentially channeled hub annulus, longitudinally channeled spokes integral with said hub annulus, and a circumferentially channeled rim integral with said spokes, the inner flange of said hub annulus being flanged inwardly and formed with upwardly presenting depressed portions, a composition body molded around and embedding said spider, the lower face of said composition body being substantially flush with the lower face of said depressed portions, and a separately formed hub member fixed to the under side of said composition body and having engagement with the lower faces of said depressed portion.

3. A steering wheel comprising a single piece pressed metal spider having a circumferentially channeled hub annulus, the inner side of said annulus being flanged inwardly, radial depressions formed in said inwardly flanged portion providing lower faces in a plane parallel with and below the plane of said inwardly flanged portions, a composition body molded around and embedding said spider, screw receiving means carried by said composition body, a separately formed hub member positioned against the lower side of said composition body and directly engaging said lower faces of said depresisons, and screw means threaded into said screw receiving means for clamping said hub in position.

4. A steering wheel comprising a single piece pressed metal spider having a circumferentially channeled hub annulus, an annular plate positioned above said hub annulus having depending internally threaded lugs extending through said hub annulus, and a composition body molded around and embedding said spider having the lower face thereof substantially flush with the ends of said depending lugs and substantially flush with portions of said hub annulus, a separately formed hub member engaging the lower ends of said depending lugs and said portions of said hub annulus, and screws threaded into said depending lugs to clamp said hub member into engagement with said lugs and portions of said hub annulus.

5. In a composition steering wheel having integrally united rim, hub and spoke portions, a reinforcing annulus embedded in said hub portion, a separately formed hub for engagement with a steering shaft abutting against said hub portion, and means for securing said separately formed hub to said composition hub portion comprising a ring member having lugs thereon extending through said reinforcing annulus and engaging said separately formed hub, and screw means extending through said separately formed hub and threaded into said lugs.

6. In a composition steering wheel having integrally united rim, hub and spoke portions, a reinforcing annulus embedded in said hub portion and having a plurality of openings therein, a separately formed hub for engagement with a steering shaft abutting against said hub portion, and means for securing said separately formed hub to said composition hub portion comprising a ring member embedded in said hub portion above and in engagement with said reinforcing annulus, said ring member having depending lugs thereon extending through said openings in said reinforcing annulus and engaging said separately formed hub, and screw means extending through said separately formed hub and threaded into said lugs.

7. In a composition steering wheel having integrally united rim, hub and spoke portions, a reinforcing annulus embedded in said hub portion and having downwardly offset portions formed around the inner edge thereof, and having their lower faces substantially flush with the lower face of said hub portion, and a separately formed hub secured to said wheel in contacting engagement with said lower faces of said offset portions.

8. In a composition steering wheel having integrally united rim, hub and spoke portions, a reinforcing annulus embedded in said hub portion and having downwardly offset portions formed around the inner edge thereof, and having their lower faces substantially flush with the lower face of said hub portion, a ring member embedded in said hub portion above and in engagement with said reinforcing annulus and having lugs thereon extending through said reinforcing annulus, said lugs terminating substantially flush with said offset portions, a separately formed hub abutting against said offset portions and said lugs, and means for securing said separately formed hub to said lugs.

In testimony whereof I affix my signature.

HARRY A. HUSTED.